(12) United States Patent
Kim et al.

(10) Patent No.: US 11,892,556 B2
(45) Date of Patent: Feb. 6, 2024

(54) METHOD AND APPARATUS FOR GENERATING ORTHOGONAL RADAR SIGNAL BASED ON FREQUENCY MODULATION

(71) Applicant: Electronics and Telecommunications Research Institute, Daejeon (KR)

(72) Inventors: Hyung Jung Kim, Daejeon (KR); Min Soo Kang, Daejeon (KR); Sang In Cho, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 160 days.

(21) Appl. No.: 17/554,364

(22) Filed: Dec. 17, 2021

(65) Prior Publication Data
US 2023/0074122 A1    Mar. 9, 2023

(30) Foreign Application Priority Data
Sep. 6, 2021    (KR) .......................... 10-2021-0118310

(51) Int. Cl.
*G01S 7/28*  (2006.01)
*G01S 13/42*  (2006.01)
*G01S 13/933*  (2020.01)

(52) U.S. Cl.
CPC .......... *G01S 7/2813* (2013.01); *G01S 13/428* (2013.01); *G01S 13/933* (2020.01)

(58) Field of Classification Search
CPC ..... G01S 7/2813; G01S 13/933; G01S 13/428
See application file for complete search history.

(56) References Cited

U.S. PATENT DOCUMENTS

| 8,928,524 B1 * | 1/2015 | Nunn | .................... G01S 13/106 |
| | | | 342/134 |
| 9,689,967 B1 * | 6/2017 | Stark | ..................... G01S 7/0233 |
| | (Continued) | | |

FOREIGN PATENT DOCUMENTS

CN    113075625 A  *  7/2021  ............... G01S 7/36

OTHER PUBLICATIONS

17554364_2023-07-19_CN_113075625_A_M.pdf, machine translation of CN-113075625-A (Year: 2021).*

(Continued)

*Primary Examiner* — Timothy A Brainard
*Assistant Examiner* — Kenneth W Good
(74) *Attorney, Agent, or Firm* — KILE PARK REED & HOUTTEMAN PLLC

(57) ABSTRACT

Disclosed is a method and apparatus for generating a radar signal, in which performance of radar detection is ensured while increasing a spectrum efficiency in a radar network. The method comprises generating a set of frequency-modulation waveforms, generating an orthogonal code set, generating a set of coded frequency-modulation waveforms through element operation between the set of frequency-modulation waveforms and the orthogonal code set, calculating an objective function for the set of frequency-modulation waveforms with regard to a different set of coded frequency-modulation waveforms and previous sets of coded frequency-modulation waveforms, and selecting a current polyphase code set as an optimized polyphase code set when a result of current calculation is better or smaller than a result of previous iteration, and performing phase perturbation by replacing an element randomly selected in the current polyphase code set selected as the optimized polyphase code set with another admissible-phase element.

18 Claims, 12 Drawing Sheets

(56) References Cited

U.S. PATENT DOCUMENTS

| | | | |
|---|---|---|---|
| 9,759,810 B1* | 9/2017 | Sankar | G01S 15/325 |
| 11,142,340 B1* | 10/2021 | Tiana | H01Q 15/18 |
| 2018/0224535 A1* | 8/2018 | Sankar | G01S 17/88 |
| 2021/0132211 A1* | 5/2021 | McCormick | G01S 7/006 |
| 2021/0208237 A1* | 7/2021 | Ravenscroft | H04L 27/2626 |
| 2022/0066456 A1* | 3/2022 | Ebrahimi Afrouzi | B25J 9/1697 |

OTHER PUBLICATIONS

Farhan A. Qazi et al., "Good Code Sets based on Piecewise Linear FM", IEEE, 2012, pp. 0522-0527.

* cited by examiner

METHOD AND APPARATUS FOR GENERATING ORTHOGONAL RADAR SIGNAL BASED ON FREQUENCY MODULATION

CROSS REFERENCE TO RELATED APPLICATION

The present application claims priority to Korean Patent Application No. 10-2021-0118310, filed Sep. 6, 2021, the entire contents of which is incorporated herein for all purposes by this reference.

BACKGROUND

Technical Field

The disclosure relates to a method of generating a radar signal, and more particularly to a method and apparatus for generating a radar signal, in which performance of radar detection is ensured while increasing a spectrum efficiency in a radar network.

Related Art

A conventional radar system has employed a frequency channel, which does not overlap with that of another radar, to avoid radio interference between the radars. However, available frequency resources are insufficient due to increase in demand for radar and broadband, and thus there has been a need for increasing a spectrum efficiency by frequency sharing between the radars.

For frequency sharing between the radars, technology of using an orthogonal signal has been proposed. As representative technology, there is radar sharing technology based on phase code diversity. In more detail, waveforms respectively having different orthogonal codes are allocated and transmitted to the radars, and a received signal passes through a code-based autocorrelator (i.e., a matched filter) at a receiving terminal to thereby remove radar signals for other radars.

To adopt the phase code diversity, the radar uses a pulse-compressed waveform by dividing a pulse into a number of short sub-pulses, and modulating and transmitting each sub-pulse with an orthogonal polyphase code set.

Even in a radar system using frequency modulation, orthogonal signal technology has been developed for frequency sharing. In more detail, the radars transmit different frequency-modulated radar waveforms, and obtain corresponding target signal information while decreasing interference signals generated from other radars through a dechirp process at receiving terminals thereof. In this process, the radars are made different in various characteristics of chirp of a transmission waveform, for example, a chirp rate, a starting frequency, etc., thereby decreasing the interference signals of other radars at their receiving terminals.

Conventional phase code diversity signal technology is excellent in performance of detecting a range from a target, but poor in performance of detecting a speed of the target. Further, conventional frequency-modulation signal technology has disadvantages in that orthogonal performance between signals is lower than that of the phase code diversity signal technology and the orthogonal performance decreases as the number of radars used concurrently increases.

Accordingly, the radar signal technology based on the frequency-modulation is required to have good orthogonal performance between signals and maintain the orthogonal performance even when the number of radars used concurrently increases.

SUMMARY

The disclosure is proposed to solve these problems and aims to provide a method and apparatus for generating an orthogonal radar signal based on frequency modulation, in which detection performance is ensured while decreasing interference with other radar systems in a frequency-modulation based radar network system where frequencies are shared to improve a spectrum efficiency.

According to an aspect of an exemplary embodiment, in a method of generating an orthogonal radar signal based on frequency modulation, the method comprises: a first step of generating a set of frequency-modulation waveforms; a second step of generating an orthogonal code set; a third step of generating a set of coded frequency-modulation waveforms through element operation between the set of frequency-modulation waveforms and the orthogonal code set; a fourth step of calculating an objective function for the set of frequency-modulation waveforms with regard to a different set of coded frequency-modulation waveforms and previous sets of coded frequency-modulation waveforms, and selecting a current polyphase code set as an optimized polyphase code set when a result of current calculation is better or smaller than a result of previous iteration; and a fifth step of performing phase perturbation by replacing an element randomly selected in the current polyphase code set selected as the optimized polyphase code set with another admissible-phase element.

The method may further comprise a sixth step of repeating the third to fifth steps until a preset stop condition is satisfied.

The objective function may be defined by a sum of a value, which is obtained by multiplying an autocorrelation sidelobe peak for the set of coded frequency-modulation waveforms by a first weighting factor value, and a value, which is obtained by multiplying a cross-correlation peak for the set of coded frequency-modulation waveforms by a second weighting factor.

A sum of the first weighting factor and the second weighting factor may be 1.

The autocorrelation sidelobe peak may correspond to a maximum value of a normalized main lobe width smaller than an absolute value of time delay of an arbitrary ($i^{th}$) coded frequency-modulation waveform among the absolute values of the $i^{th}$ coded frequency-modulation waveform.

The cross-correlation peak may correspond to a maximum value of time delay of an arbitrary $i^{th}$ coded frequency-modulation waveform among the absolute values of the cross-correlation functions of the $i^{th}$ coded frequency-modulation waveform and an arbitrary ($j^{th}$) coded frequency-modulation waveform different from the $i^{th}$ coded frequency-modulation waveform.

The cross-correlation functions of the $i^{th}$ and $j^{th}$ coded frequency-modulation waveforms with respect to the time delay may be generated by multiplying another arbitrary ($l^{th}$) coded frequency-modulation waveform by an $l^{th}$ frequency-modulation waveform and an $l^{th}$ polyphase-code sequence.

According to another aspect of an exemplary embodiment, in a method of generating an orthogonal radar signal based on frequency modulation, the method comprises: generating a set of coded frequency-modulation waveforms through element operation between a set of frequency-modulation waveforms and a polyphase code set; and calculating an objective polyphase code set or an optimized polyphase code set based on a domain parameter that minimizes an objective function for the set of coded frequency-modulation waveforms, wherein the objective function is calculated by a sum of a value, which is obtained by multiplying an autocorrelation sidelobe peak for the set of coded frequency-modulation waveforms by a first weighting factor value, and a value, which is obtained by multiplying a cross-correlation peak for the set of coded frequency-modulation waveforms by a second weighting factor.

The autocorrelation sidelobe peak may correspond to a maximum value of a normalized main lobe width smaller than an absolute value of time delay of an arbitrary $i^{th}$ coded frequency-modulation waveform among the absolute values of the $i^{th}$ coded frequency-modulation waveform.

The cross-correlation peak may correspond to a maximum value of time delay of the $i^{th}$ coded frequency-modulation waveform among the absolute values of the cross-correlation functions of the $i^{th}$ coded frequency-modulation waveform and an arbitrary $j^{th}$ coded frequency-modulation waveform different from the $i^{th}$ coded frequency-modulation waveform.

The cross-correlation functions of the $i^{th}$ and $j^{th}$ coded frequency-modulation waveforms with respect to the time delay may be generated by multiplying another arbitrary $l^{th}$ coded frequency-modulation waveform by an $l^{th}$ frequency-modulation waveform and an $l^{th}$ polyphase-code sequence.

According to further another aspect of an exemplary embodiment, in an apparatus for generating an orthogonal radar signal based on frequency modulation, the apparatus comprises: an element operation module configured to generate a set of coded frequency-modulation waveforms from a set of input frequency-modulation waveforms and a randomly generated polyphase code set; a calculation module configured to calculate an objective function for the set of frequency-modulation waveforms with respect to a different set of coded frequency-modulation waveforms and previous sets of coded frequency-modulation waveforms, and select a current polyphase code set as an optimized polyphase code set when a result of current calculation is better or smaller than a result of previous iteration; and a polyphase code perturbation module configured to perform polyphase-phase perturbation by replacing an element randomly selected in the current polyphase code set selected as the optimized polyphase code set with another admissible-phase element.

The apparatus may further comprise: an input terminal connected to the element operation module and configured to receive the set of frequency-modulation waveforms; and an output terminal connected to the calculation module and configured to output a set of optimized coded frequency-modulation waveforms through element operation between the optimized polyphase code set and the set of frequency-modulation waveforms.

The objective function may be calculated by a sum of a value, which is obtained by multiplying an autocorrelation sidelobe peak for the set of coded frequency-modulation waveforms by a first weighting factor value, and a value, which is obtained by multiplying a cross-correlation peak for the set of coded frequency-modulation waveforms by a second weighting factor A sum of the first weighting factor and the second weighting factor may be 1.

The autocorrelation sidelobe peak may correspond to a maximum value of a normalized main lobe width smaller than an absolute value of time delay of an arbitrary $i^{th}$ coded frequency-modulation waveform among the absolute values of the $i^{th}$ coded frequency-modulation waveform.

The cross-correlation peak may corresponds to a maximum value of time delay of an arbitrary $i^{th}$ coded frequency-modulation waveform among the absolute values of the cross-correlation functions of the $i^{th}$ coded frequency-modulation waveform and an arbitrary $j^{th}$ coded frequency-modulation waveform different from the $i^{th}$ coded frequency-modulation waveform.

The apparatus may further comprise a condition setting module coupled to the calculation module and configured to repeat the operations of the element operation module, the calculation module and the polyphase-code perturbation module until a preset stop condition is satisfied.

The element operation module, the calculation module and the polyphase-code perturbation module may be coupled individually or as a single module assembly to a pulse-compression-based frequency-modulation radar system The pulse-compression-based frequency-modulation radar system may comprise a plurality of radars that share frequencies.

BRIEF DESCRIPTION OF DRAWINGS

In order that the disclosure may be well understood, there will now be described various forms thereof, given by way of example, reference being made to the accompanying drawings, in which.

DETAILED DESCRIPTION OF THE EMBODIMENTS

Figure 1:
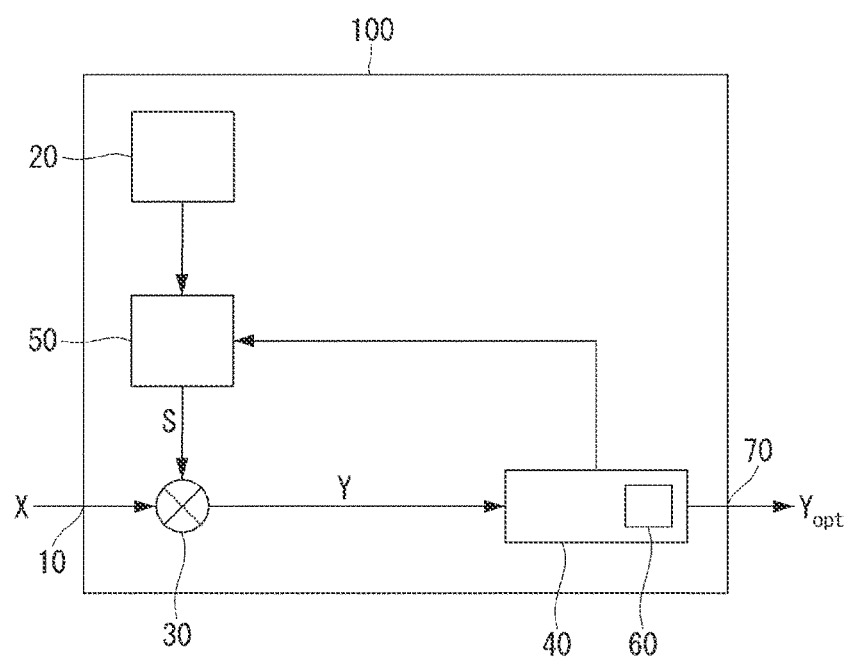
FIG. 1 is a block diagram of an apparatus for generating an orthogonal radar signal based on frequency modulation according to an embodiment of the disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these tams. These terms are only used to distinguish one element from another. For example, a first element could be tamed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the tams "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram of an apparatus for generating an orthogonal radar signal based on frequency modulation according to an embodiment of the disclosure.

Referring to FIG. 1, the apparatus for generating the orthogonal radar signal based on the frequency modulation (hereinafter, referred to as a radar-signal generating apparatus) 100 may include an input terminal 10, a polyphase-code set generating module 20, an element operation module 30, a calculation module 40, a polyphase-code perturbation module 50, a condition setting module 60, and an output terminal 70.

The input terminal 10 may include a port or terminal to which a set of frequency-modulation waveforms (e.g., a set of linear frequency-modulation waveforms, X) is input, and be connected to one of inputs of the element operation module 30.

The polyphase code set generating module 20 generates a polyphase code set (e.g., a set of polyphase code sequences, S) randomly. When the radar signal generating apparatus 100 receives a random polyphase code set from the outside, the polyphase code set generating module 20 may be excluded.

The element operation module 30 generates a set of frequency-modulation waveforms (e.g., a set of coded LFM (linear frequency modulation) waveforms, Y) coded through element operation between the input set of frequency-modulation waveforms X and the random polyphase code set S.

The calculation module 40 calculates an objective function for the set of frequency-modulation waveforms Y coded with regard to a different set of coded frequency-modulation waveforms and previous sets of coded frequency-modulation waveforms, and selects the current polyphase code set S as an optimized polyphase code set $S_{opt}$ when a result of current calculation is better or smaller than a result of previous iteration.

The polyphase-code perturbation module 50 performs phase perturbation or polyphase-code perturbation by replacing an element randomly selected in the current polyphase code set selected as the optimized polyphase code set based on a signal from the calculation module 40 or a control signal corresponding to the signal with another admissible-phase element. The phase-perturbed polyphase code set may be provided to the element operation module 30.

The condition setting module 60 functions to repeat the operations of the element operation module 30, the calculation module 40 and the polyphase-code perturbation module 50 until a preset stop condition is satisfied. The condition setting module 60 may be mounted or combined to the calculation module 40.

The output terminal 70 is connected to the calculation module 40 and output the optimized polyphase code $S_{opt}$ or the set of coded LFM waveforms $Y_{opt}$ optimized through the element operation between the optimized polyphase code set $S_{opt}$ and the set of LFM waveforms X.

The foregoing embodiment provides a method of generating the set of orthogonal frequency-modulation waveforms for radar, which maximizes the orthogonality of the coded frequency-modulation waveforms. The coded frequency-modulation waveform refers to a frequency modulation signal encoded with a code. In other words, this embodiment may provide a new optimization frame-work that optimizes not the orthogonal code but the coded frequency-modulation waveform in order to maximize the orthogonality.

Further, to generate the set of optimized coded LFM waveforms, the method and apparatus for generating the radar signal according to an embodiment may provide a new optimization framework to find the set of coded frequency-modulation waveforms which minimize an objective function or cost function as a weighted sum of an autocorrelation sidelobe peak (ASP) and a cross-correlation peak (CP).

To describe a process of generating the set of optimized coded LFM waveforms, the polyphase code set used in encoding a frequency-modulation waveform and a frequency-modulation signal will be first described, and then a method of finding a set of coded linear frequency modulation waveforms optimally coded through an optimization process proposed in this embodiment will be described.

1) Frequency-Modulation Waveform

An LFM waveform is a signal of which a frequency increases (up-chirp) or decreases (down-chirp) linearly with time, and the LFM waveform is obtained by the following [Equation 1].

$$x(t) = \exp\left[j2\pi\left(f_0 t + \frac{1}{2}\alpha t^2\right)\right] \cdot 1_{[0,T_p]}(t) \quad \text{[Equation 1]}$$

where $T_p$, $f_0$, $\alpha$ are a pulse width, a starting frequency, and a chirp rate, respectively. $1_{[0,T_p]}(t)$ is an indicator function and expressed as follows.

$$1_{[0,T]}(t) = \begin{cases} 1, & 0 \le t \le T \\ 0, & \text{otherwise} \end{cases} \quad \text{[Equation 2]}$$

When the starting frequency ($f_0$) is zero in the foregoing [Equation 1], the Equation 2 can be simplified as follows.

$$x(t) = \exp(j\pi\alpha t^2) \cdot 1_{[0,T_p]}(t) \quad \text{[Equation 3]}$$

An LFM waveform set, X, consists of L LFM waveform and is defined as follows.

$$X = [x_0(t), x_1(t), \ldots, x_{L-1}(t)]^T \quad \text{[Equation 4]}$$

where $V^T$ is a transpose of vector V.

2) Polyphase Code Set

To generate a coded LFM waveform, a polyphase-code sequence is employed so that it allows a higher degree of freedom in the optimization process according to this embodiment than a well-known binary code set (e.g., Barker code, Walsh-Hadamard code, gold sequence), leading to better orthogonality. A polyphase code set may be composed of L codes; each code includes N sub-pulses elements. The polyphase code set S is defined as follows.

$$S = [s_0, s_1, \ldots, s_{L-1}] \quad \text{[Equation 5]}$$

where, $s_l$ is a code l and $s_l(n)$ is the $n^{th}$ element of $s_l$, which can be expressed by the following [Equation 6].

$$s_l = [s_l(0), s_l(1), \ldots, s_l(N-1)]$$

and $$\{s_l(n) = \exp[\phi_l(n)], n=0,1,\ldots,N-1\}, l=0,1,\ldots,L-1 \quad \text{[Equation 6]}$$

where $\phi_l(n)(0 \le \phi_l(n) \le 2\pi$ is the phase value of $s_l(n)$.

It is noted that the $n^{th}$ element of code l is used for encoding the $n^{th}$ sub-pulse of LMF waveform l.

Further, a phase value $\phi_l(n)$ of the $n^{th}$ sub-pulse of a certain code sequence can be selected from the following admissible values.

$$\phi_l(n) \in \left\{0, \frac{2\pi}{M}, 2 \cdot \frac{2\pi}{M}, \ldots, (M-1) \cdot \frac{2\pi}{M}\right\} \quad \text{[Equation 7]}$$

where M is the number of distinct phases in a code.

3) Coded Frequency-Modulation Waveform

The $l^{th}$ coded LFM waveform $y_l(t)$ can be generated by multiplying the $l^{th}$ LFM waveform and the $l^{th}$ code sequence, and can be defined as follows.

$$y_l(t) = x_l(t) \cdot \sum_{n=0}^{N-1} P(t - nT_c) \cdot s_l(n) = \sum_{n=0}^{N-1} e^{j\pi\alpha_l t^2} \cdot P(t - nT_c) \cdot e^{j\phi_l(n)} \quad \text{[Equation 8]}$$

where $T_c$ and P(t) are a chip time and rectangular pulse, respectively.

The foregoing [Equation 8] may be briefly defined as follows.

$$y_l(t) = x_l(t) \odot s_l. \quad \text{[Equation 9]}$$

Further, A set of coded LFM waveform Y, consists of L coded LFM waveforms as follows.

$$Y = [y_0(t), y_1(t), \ldots, y_{L-1}(t)] = X \circ S \quad \text{[Equation 10]}$$

where $X \circ S$ is an element operation of $\odot$ between X and S.

4) Optimization Frame-Work

If polyphase code set S is first optimized and then generates a coded LFM waveform based on the optimized S (simply, $S_{opt}$), the orthogonality of S would be degraded. As a solution of this problem, this embodiment provides a new optimization framework to find a set of optimized coded LFM waveforms, $Y_{opt}$, that minimizes an objective function that is the weighted sum of autocorrelation sidelobe peaks (ASP) and cross-correlation peaks (CP).

In the optimization frame-work provided according to this embodiment, as an LFM waveform is not varied, finding a set of coded LFM waveforms $Y_{opt}$ is comparable to finding a set of optimized polyphase code set $S_{opt}$.

Hence, the optimization framework according to this embodiment employs polyphase code set S as a configurable parameter. Through the optimization process according to this embodiment, it is possible to maximize the orthogonality of coded LFM waveforms, which are actually transmitted by actual radar.

The optimization problem may be formulated as follows.

$$S_{opt} = \underset{S}{\operatorname{argmin}} Obj(Y) \quad \text{[Equation 11]}$$

where Obj(Y) is an objective function when a set of coded LFM waveforms is Y. Obj(Y) may be expressed by the following [Equation 12].

$$Obj(Y) = (1-\lambda)ASP(Y) + \lambda CP(Y) \quad \text{[Equation 12]}$$

where $\lambda$ is a weighting factor, ASP(Y) and CP(Y) are autocorrelation sidelobe peak and cross-correlation peak, respectively. ASP(Y) and CP(Y) are described by the following [Equation 13] and [Equation 14], respectively.

$$ASP(Y) = \max_{i} \max_{|k|>ML_i} |R_i(k)| \quad \text{[Equation 13]}$$

$$CP(Y) = \max_{i,j,i \ne j} \max_{k} |R_{ij}(k)| \quad \text{[Equation 14]}$$

where k and $ML_i$ are the time delay and a normalized main lobe width of the $i^{th}$ coded LFM waveform, respectively. $R_{ij}(\cdot)$ is a cross-correlation function of the $i^{th}$ and $j^{th}$ coded LFM waveforms and $R_i(\cdot)$ is an autocorrelation function of the $i^{th}$ coded LFM waveform.

Further, the cross-correlation function $R_{ij}(\cdot)$ of the $i^{th}$ and $j^{th}$ coded LFM waveforms can be expressed by the following [Equation 15].

$$R_{ij}(k) = \sum_{n=-\infty}^{k} y_i(n) \cdot y_{j*}(n-k) \quad \text{[Equation 15]}$$

where $y_i(n)$ is an $n^{th}$ element of discrete sequences for $y_i(t)$ and $y^*$ is a complex conjugate of $y$.

Further, the autocorrelation function $R_i(k)$ related to the delay time of the $i^{th}$ coded LFM waveform can be easily obtained by replacing $y_j^*(n-k)$ with $y_{i*(n-k)}$.

The main lobe width $ML_i$ may be defined by the following [Equation 16].

$$ML_i = \left[ \min(k > 0) \text{ s.t. } |R_i(k)| < \frac{1}{\sqrt{N}} \right] - 1 \quad \text{[Equation 16]}$$

Figure 2:
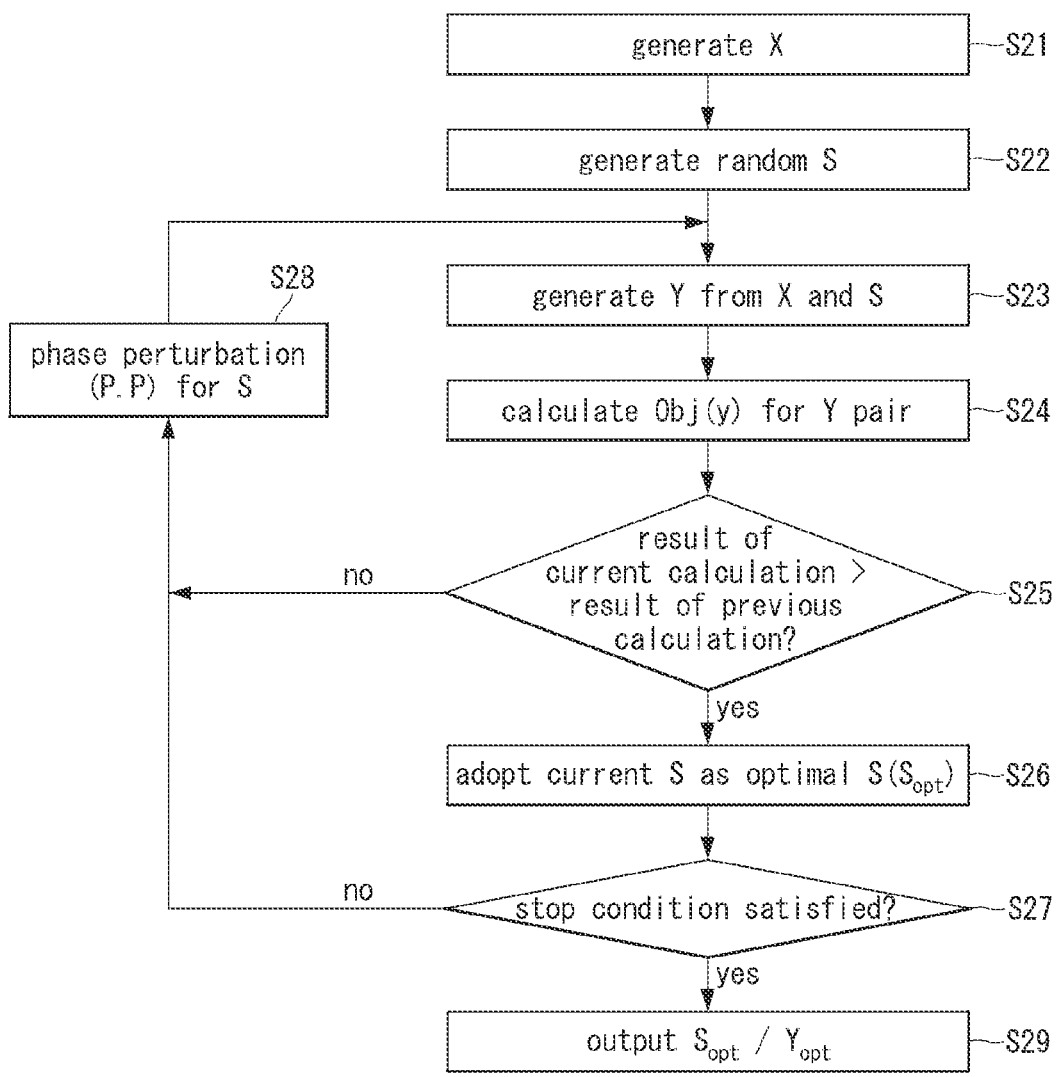
FIG. 2 is a flowchart showing a method of generating an orthogonal radar signal based on frequency modulation, which may be used for the apparatus of FIG. 1.

FIG. 2 is a flowchart showing a method of generating an orthogonal radar signal based on frequency modulation, which may be used for the apparatus of FIG. 1.

Referring to FIG. 2, the structure or process of obtaining optimized polyphase code set $S_{opt}$ according to this embodiment may include the following steps.

First, a LFM waveform set, X, is generated (S21).

Next, a random polyphase code set, S, is generated (S22).

Next, ae set of coded LFM waveforms, Y, is generated (S23) (the $3^{rd}$ step).

Next, the objective function, bj(Y), is calculated, for any pair of Y (S24). Further, If finding better calculation result is obtained than the result of the previous iteration (S25), the current polyphase code set S is adopted as a candidate of optimized random polyphase code set $S_{opt}$ (S26) (the $4^{th}$ step).

Next, when the stop condition is not satisfied (NO in S27) in the phase perturbation process or polyphase code perturbation process, randomly selected element in the polyphase code set S is replaced with a different admissible phase. In other words, the phase perturbation (P.P.) is performed with regard to the polyphase code set S (S28) (the $5^{th}$ step). Further, the foregoing $3^{rd}$ to 5th steps are repeated until the stop condition is satisfied.

Next, when the stop condition is satisfied (YES in S27), the method of generating the orthogonal radar signal based on the frequency modulation or the apparatus of carrying out the same may output optimized polyphase codes set $S_{opt}$ or a set of optimized coded LFM waveforms $Y_{opt}$ (S29). The set of optimizes coded LFM waveforms $Y_{opt}$ may be obtained by the element operation between the optimized polyphase code set $S_{opt}$ and the set of frequency waveforms X.

Figure 3:
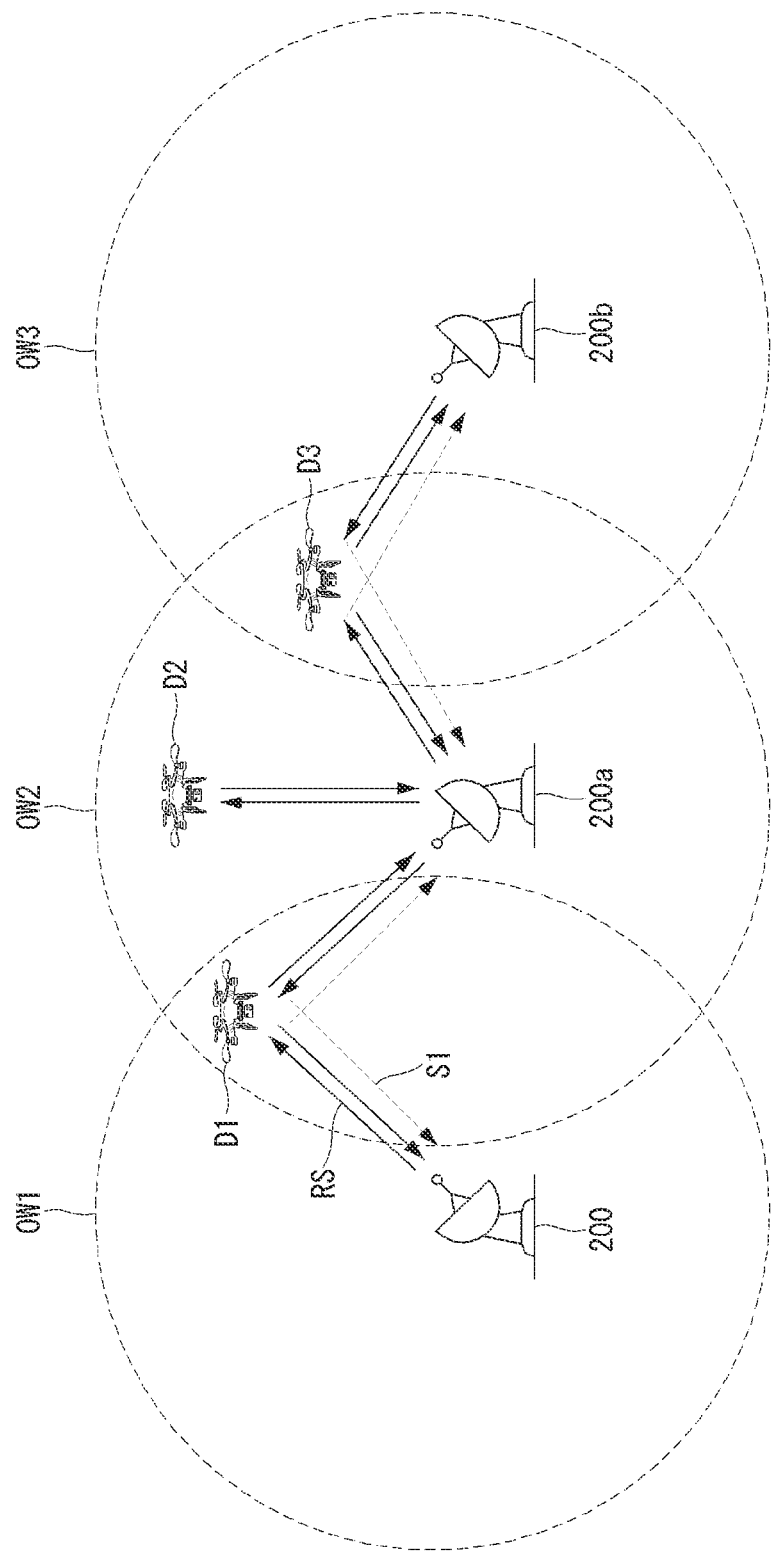
FIG. 3 illustrates a frequency-sharing radar network based on the method of generating the radar signal of FIG. 2.

FIG. 3 illustrates a frequency-sharing radar network based on the method of generating the radar signal of FIG. 2.

Referring to FIG. 3, a first radar 200, a second radar 200a and a third radar 200b respectively generate and transmit orthogonal waveforms OW1, OW2 and OW3 toward drone targets D1, D2 and D3, and receive orthogonal waveforms reflected from at least some drone targets D1 and D3.

For example, the orthogonal radar signal (RS) generated by the first radar 200 may be reflected from the drone target D1 and received in the second radar 200a, or, on the contrary to this, the orthogonal radar signal generated by the second radar 200a may be reflected from the drone target D1 and then received as an interference-causing signal (see S1) in the first radar 200. Likewise, the orthogonal radar signal generated by the second radar 200a may be reflected from another drone target D3 and then received in the third radar 200b, or reversely the orthogonal radar signal generated by the third radar 200b may be reflected from the drone target D3 and then received in the second radar 200a.

In other words, the signal S1 received from other radars may cause radio interference with the radars. To solve this problem, there has been proposed a phase code diversity based spectrum shared radar system (SSRS) in which several radars share the same frequency band to transmit and receive their own signals. However, the SSRS uses the orthogonal waveform, which inherits the orthogonality of the waveform from the orthogonal code, and therefore there is a limit that the inherited orthogonality of the code is largely decreased when the frequency sharing radar system combines the linear frequency modulation (LFM, simply 'frequency modulation') waveform with the code.

Thus, according to this embodiment, the existing problem is solved based on a method of minimizing the weighted sum of the autocorrelation sidelobe peak (ASP) and the cross-correlation peak (CP) of the coded LFM waveform.

Such a method of generating a radar signal according to this embodiment employs the pulse-compressed LFM waveform, which has been adopted and used in many radar systems due to its easy hardware implementation and excellent ranging/Doppler resolution, and is thus easily applied to a radar network system sharing the frequencies. The radar network system may include an airport control radar system, a weather radar system, a maritime surveillance radar system, etc.

Further, the method of generating a radar signal according to this embodiment is very useful when the use of the orthogonal radar signal is needed in the radar system that necessarily requires frequency sharing due to a problem of insufficient available frequencies.

In this way, the method of generating a radar signal according to this embodiment measures the strength of the interference signal between the radars in real time, applies three waveform generating methods according to the amount of interference, finds the set of optimized LFM waveforms reflecting the waveform generating methods, and applies the found set to the radars, thereby effectively eliminating the interference signal between the radars that share the frequencies, and ensuring target detection performance in the frequency-sharing radar network.

Figure 4:
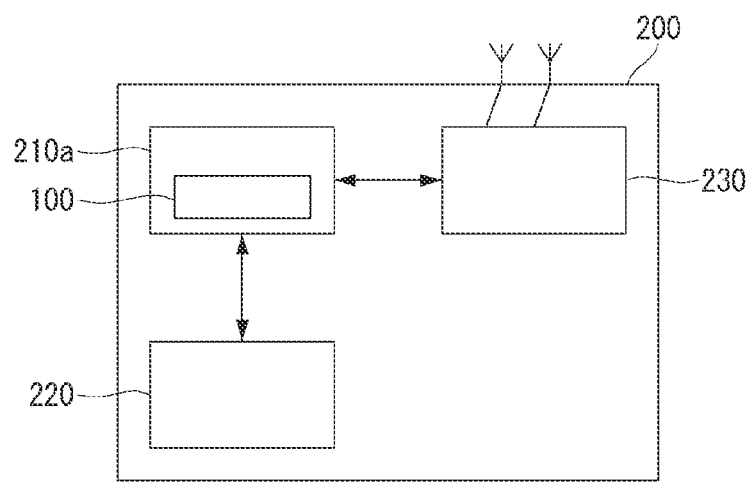
FIG. 4 is a block diagram showing major parts of a pulse-compression-based frequency-modulation radar system with the radar-signal generating apparatus of FIG. 1.

FIG. 4 is a block diagram showing major parts of a pulse-compression-based frequency-modulation radar system with the radar-signal generating apparatus of FIG. 1.

Referring to FIG. 4, the pulse-compression-based frequency-modulation radar system (hereinafter, simply referred to as a 'radar system') may include a radio platform 200, and the radio platform 200 may include a processor 210a, a memory 220, and a transceiver 230.

The processor 210a may be provided with a means for implementing the radar-signal generating method described with reference to FIG. 1 or 2 or a component corresponding to this means, in other words, the radar-signal generating apparatus 100. The radar-signal generating apparatus 100 may partially include the hardware and/or software of the processor 210a.

Further, the processor 210a may include a central processing unit for control and data processing, a waveform generator for generating a radar signal waveform based on pulse compression under control of the central processing unit and transmitting the radar signal waveform to the transceiver 230, and a signal processor for processing a pulse-compressed radar signal received from the transceiver 230.

The memory 220 includes a read-only memory (ROM), a random access memory (RAM) and the like storage, and stores a software module or program instruction that implements the radar-signal generating method. The software module may include a polyphase-code set generating module, an element operation module, a calculation module, and a polyphase-code perturbation module. The software module or program instruction stored in the memory 220 may be loaded into the processor 210 under control of the processor 210a or the radar-signal generating apparatus 100 and implement a corresponding function.

The transceiver 230 includes a transmitter and a receiver for transmitting and receiving a radio frequency (RF) signal, and may be connected to an antenna through a duplexer.

The transmitter of the transceiver 230 may for example include a reference signal generator, a digital waveform generator, and a frequency upconverter, and the receiver may for example include a frequency downconverter, an analog-to-digital converter, a digital downconverter, and a pulse-compressed signal processor. The digital waveform generator may generate a pulse-compression-based radar transmission waveform.

Figure 5:
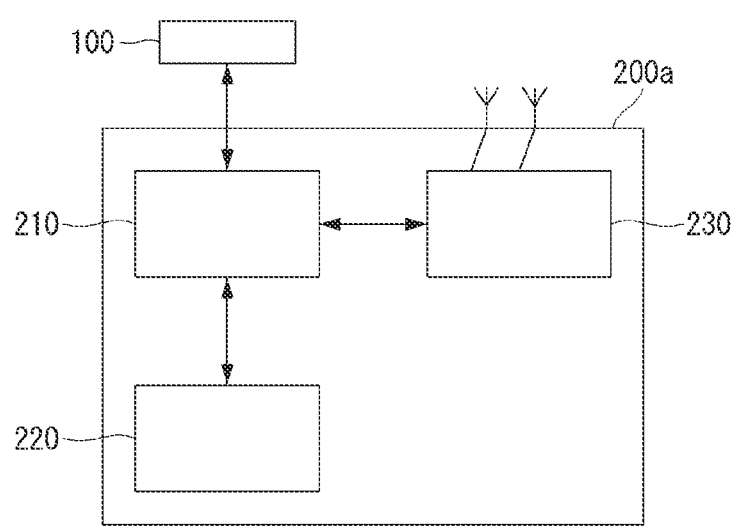
FIG. 5 is a block diagram showing major parts of a pulse-compression-based frequency-modulation radar system to which the radar-signal generating apparatus of FIG. 1 is mounted in the form of an additional module.

FIG. 5 is a block diagram showing major parts of a pulse-compression-based frequency-modulation radar system to which the radar-signal generating apparatus of FIG. 1 is mounted in the form of an additional module.

Referring to FIG. 5, the pulse-compression-based frequency-modulation radar system includes a radio platform 200a, and the radar-signal generating apparatus 100 connected to the radio platform 200a, and the radio platform 200a may include the processor 210, the memory 220 and the transceiver 230.

The radar-signal generating apparatus 100 may correspond to a means for implementing the radar-signal generating method described with reference to FIG. 1 or 2, or a component corresponding to this means. The radar-signal generating apparatus 100 may include the polyphase-code set generating module, the element operation module, the calculation module, and the polyphase-code perturbation module individually or in the form of a single module assembly, be added to the radio platform 200a, and be electrically connected to the processor 210.

The processor 210 may be installed to include substantially the same components except the radar-signal generating apparatus 100 or implement the same function as the processor 210a described above with reference to FIG. 4. Likewise, the memory 220 or the transceiver 230 may be substantially the same as those described above with reference to FIG. 4.

As described above with reference to FIGS. 4 and 5, the radar-signal generating apparatus 100 may be mounted to the pulse-compression-based frequency-modulation radar system or to the radio platform of this system, or installed as coupled in the form of an external module assembly.

In the pulse-compression-based frequency-modulation radar system to which the radar-signal generating apparatus 100 is mounted or connected, a plurality of radars can operate sharing frequencies, thereby improving a spectrum efficiency and ensuring detection performance while reducing interference from other radars.

The radar-signal generating method of generating the foregoing set of optimized coded LFM waveforms according to this embodiment is evaluated as follows. In more detail, this evaluation is based on two performance measurement results for evaluating orthogonality as functions of some independent variables, in other words, performance measurement results of the ASP and the CP. The independent variables include code length N, the number of distinct phases M, a weighting factor λ and the number of radars L.

Because the optimization process is to find a phase matrix S which is a polyphase code set, L, M and N are selected as the independent variables to form the phase matrix S, and λ is used as the objective function. The pulse width and band width of the LFM waveform may be set to 1 μs.

In this evaluation, a hybrid optimization process was adopted to find the set of optimized coded LFM waveforms. The optimized coded LFM waveforms according to this embodiment were compared in orthogonality with the SSCL waveforms according to comparative examples. The SSCL waveforms according to comparative examples employed two types of coded waveforms, i.e., the SSCL waveforms encoded with the Walsh-Hadamard code (SSCL-Hadamard) and the SSCL waveforms encoded with a polyphase code derived from the SSCL-Polyphase (SSCL-Polyphase).

The following [Table 1] shows default values of parameters.

TABLE 1

| Parameter | Default value |
| --- | --- |
| $T_p$, pulse width | 1 μs |
| B, chirp bandwidth | 16 MHz |
| L, the number of radars | 4 |
| M, the number of phases | 2 |
| N, code length | 32 |
| λ, weighting factor | 0.5 |

Figure 6A:
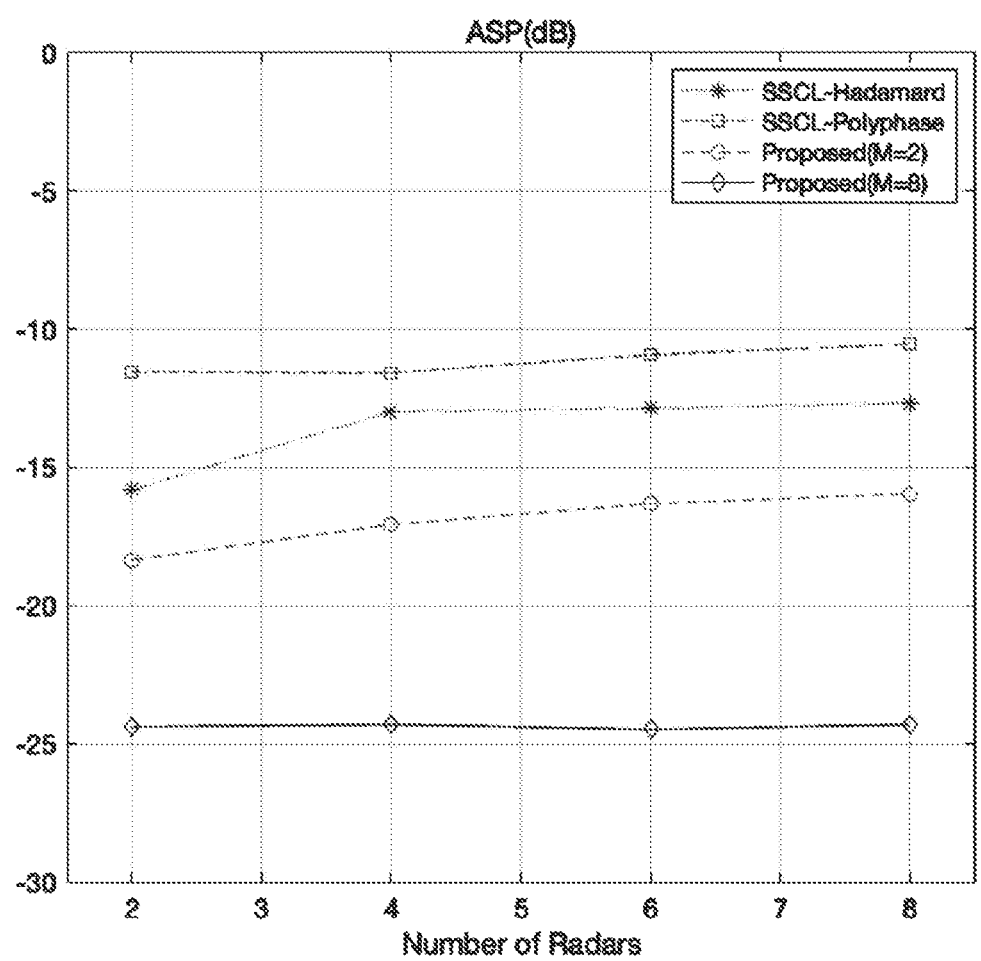
FIGS. 6A and 6B are graphs showing ASP and CP according to the number of radars in performance evaluation of the radar-signal generating apparatus according to this embodiment together with comparative examples.
Figure 6B:
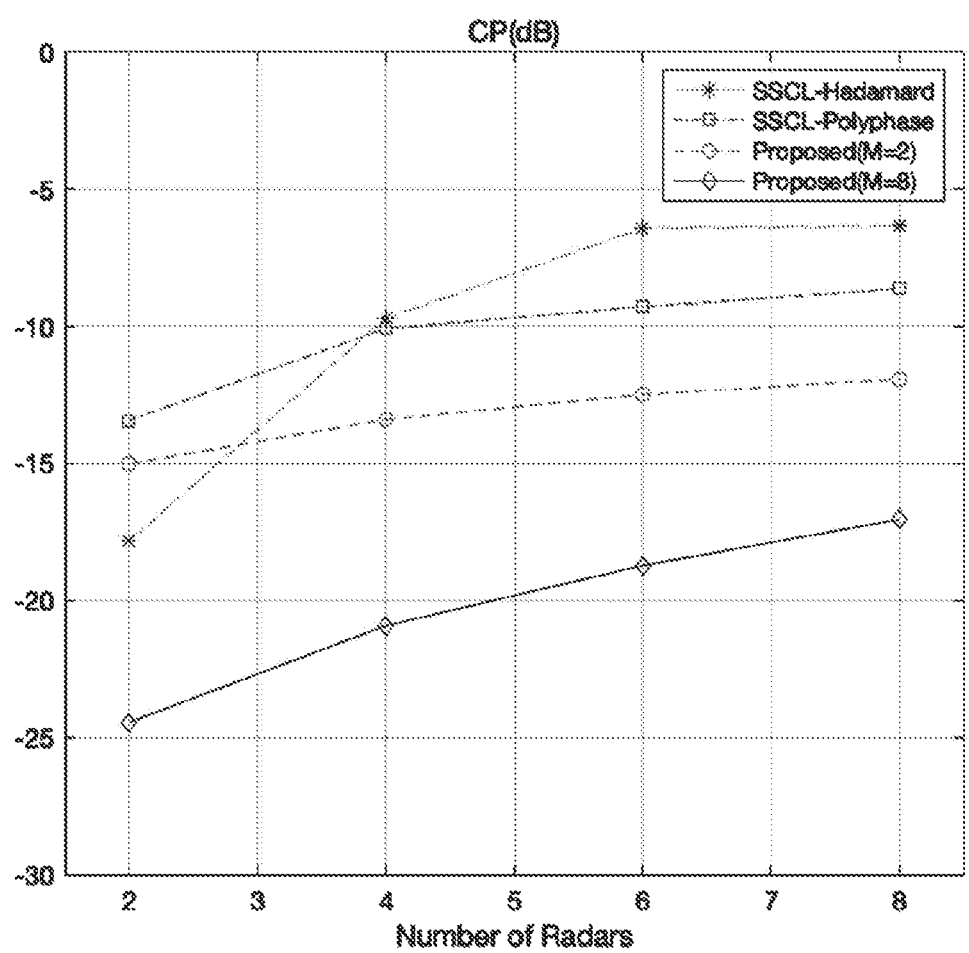

FIGS. 6A and 6B are graphs showing ASP and CP according to the number of radars in performance evaluation of the radar-signal generating apparatus according to this embodiment together with comparative examples.

As a result of the performance evaluation of the radar-signal generating apparatus according to this embodiment, ASP and CP of the optimized coded LFM waveforms are lower than those of the spread spectrum coded LFM (SSCL)-Hadamard ('comparative example 1') and the SSCL-Polyphase ('comparative example 2'). This is because the objective function of the proposed optimization framework according to this embodiment is a function of coded LFM waveforms. In contrast, the objective function for obtaining SSCL-Hadamard and SSCL-Polyphase is based on orthogonal codes, of which orthogonality can be degraded during multiplication with LFM waveforms.

As shown in FIGS. 6A and 6B, ASP and CP increase with the number of radars in both the coded LFM waveforms according to this embodiment and two comparative examples (the SSCL-Hadamard and the SSCL-Polyphase). This is because it is unlikely to select a set of waveforms to produce good orthogonality for all pairs of waveforms as the number L of radars or their waveforms increases. Moreover, according to this embodiment, an additional gain is obtained by increasing the number M of distinct phases in the LFM waveforms, for example, from 2 to 8.

Figure 7A:
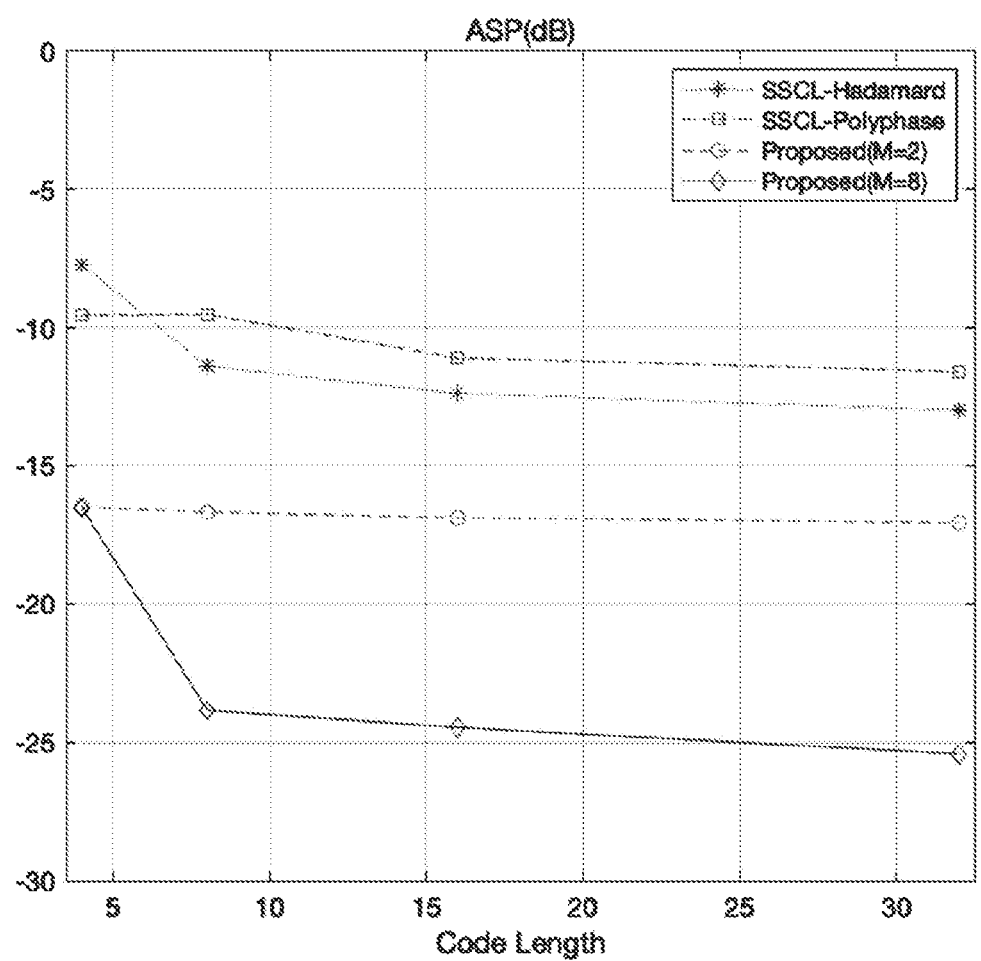
FIGS. 7A and 7B are graphs showing ASP and CP according to the code lengths in performance evaluation of the radar-signal generating apparatus according to this embodiment together with comparative examples.
Figure 7B:
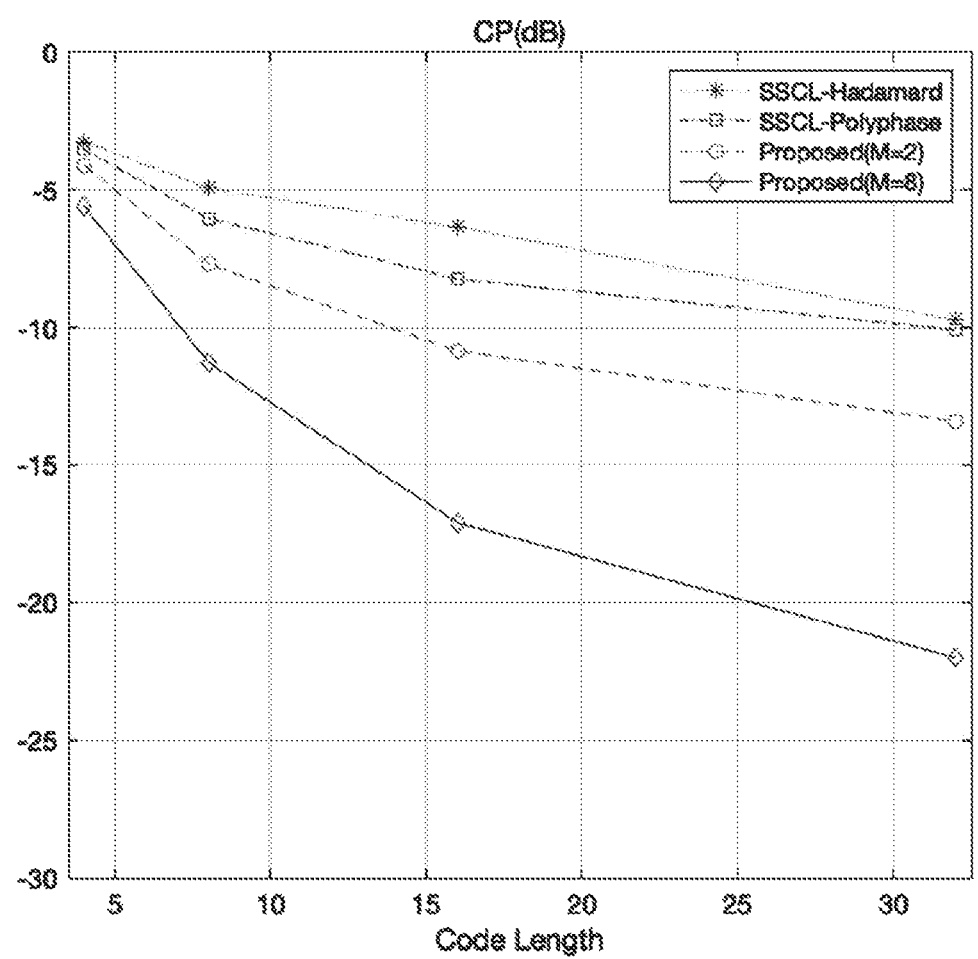

FIGS. 7A and 7B are graphs showing ASP and CP according to the code lengths in performance evaluation of the radar-signal generating apparatus according to this embodiment together with comparative examples.

Referring to FIGS. 7A and 7B, the proposed optimized coded LFM waveforms according to this embodiment outperforms the SSCL-Hadamard and SSCL-Polyphase of the two comparative examples in terms of ASP and CP.

Further, Similar to FIGS. 6A and 6B, this embodiment shows that the additional gain can be obtained by selecting large M in the proposed optimized coded LFM waveform. Specifically, CP decreases exponentially with the code length and ASP is likely to converge with the code length. From this observation, it is understood that the code length is a dominant factor affecting the orthogonality. This is because the degree of freedom (DoF) increases exponentially with the code length, which implies that it is possible to select a set of coded waveforms with large orthogonality in the optimization process according to this embodiment.

Thus, an appropriate tradeoff is required between the bandwidth of the radar system and the code length satisfying the orthogonal performance in the proposed scheme of this embodiment. Specifically, the bandwidth of the waveform rises linearly with the code length, but the gains in ASP and CP tend to gradually decrease with the code length, as depicted in FIGS. 7A and 7B. This implies the longer code length favor the orthogonal gain achievable with the number of phases.

FIGS. 6A, 6B, 7A and 7B confirm that the set of orthogonal waveforms generated according to this embodiment can generate a better set of orthogonal waveforms than those of the two comparative examples. In other words, it is possible to further improve the orthogonal waveforms by controlling the number of distinct phases. To confirm this, ASP and CP of the proposed optimized LFM waveforms according to the number of distinct phases may be evaluated additionally.

Figure 8A:
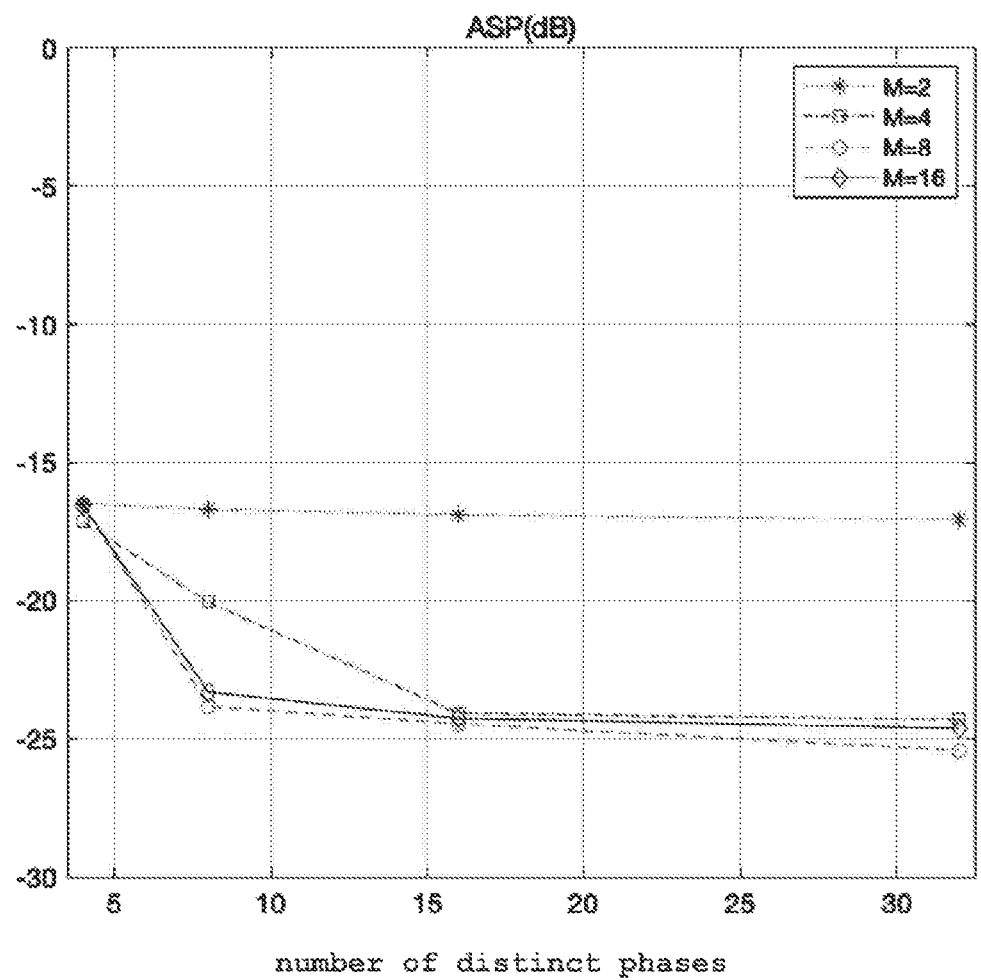
FIGS. 8A and 8B show that both ASP and CP decrease with the number of distinct phases M (M=2, 4, 8 and 16) in performance evaluation of the radar-signal generating apparatus according to this embodiment together with comparative examples.
Figure 8B:
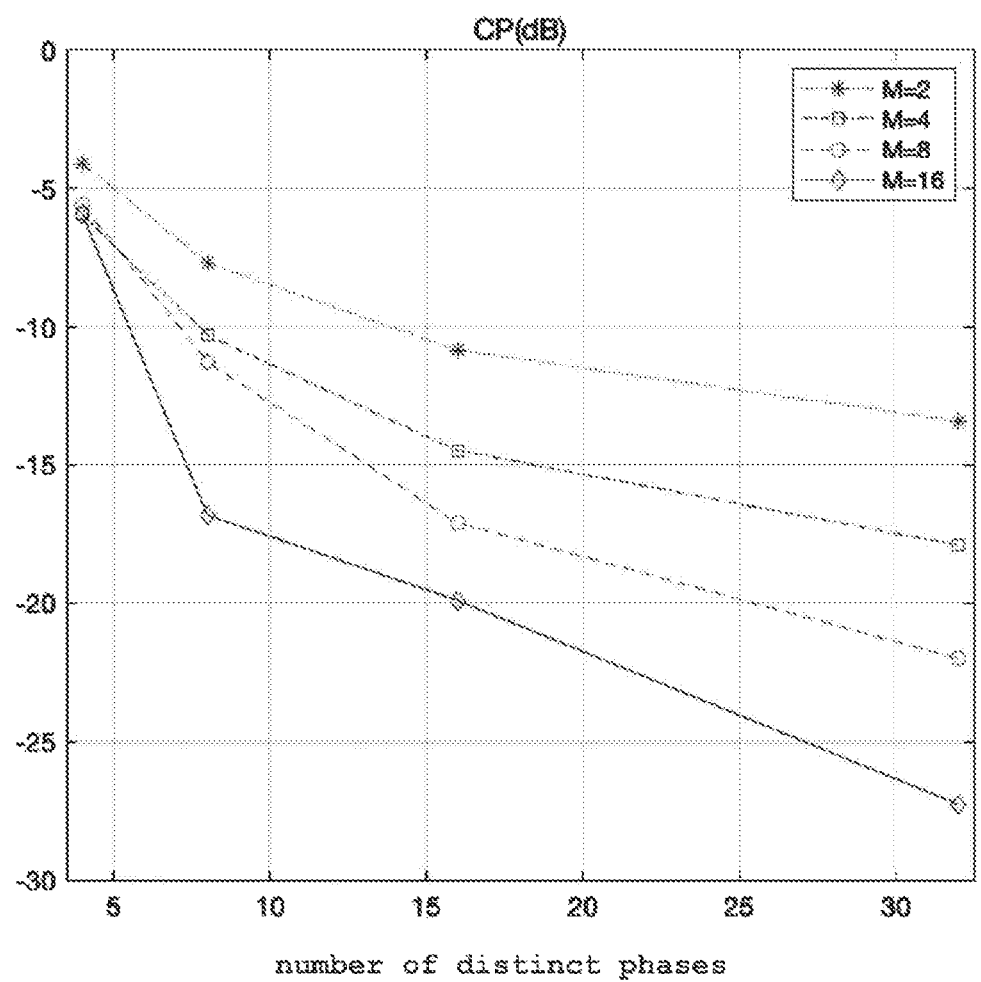

FIGS. 8A and 8B show that both ASP and CP decrease with the number of distinct phases in performance evaluation of the radar-signal generating apparatus according to this embodiment together with comparative examples.

Referring to FIGS. 8A and 8B, the ASP and the CP are decreased according to the number of distinct phases. In particular, the gain induced by adopting a large M increased with the code length N. This phenomenon comes from the fact that the degree of freedom (DoF) in the optimization process increases exponentially with the code length N.

Meanwhile, the weighting factor $\lambda$ is an important design parameter affecting ASP and CP of optimized coded LFM waveforms. Specifically, a set of coded LFM waveforms with large $\lambda$ reduce CP aggressively with sacrificing ASP. Thus, ASP and CP of the optimized coded LFM waveforms of this embodiment may be evaluated according to the weights or the weighting factor $\lambda$.

Figure 9A:
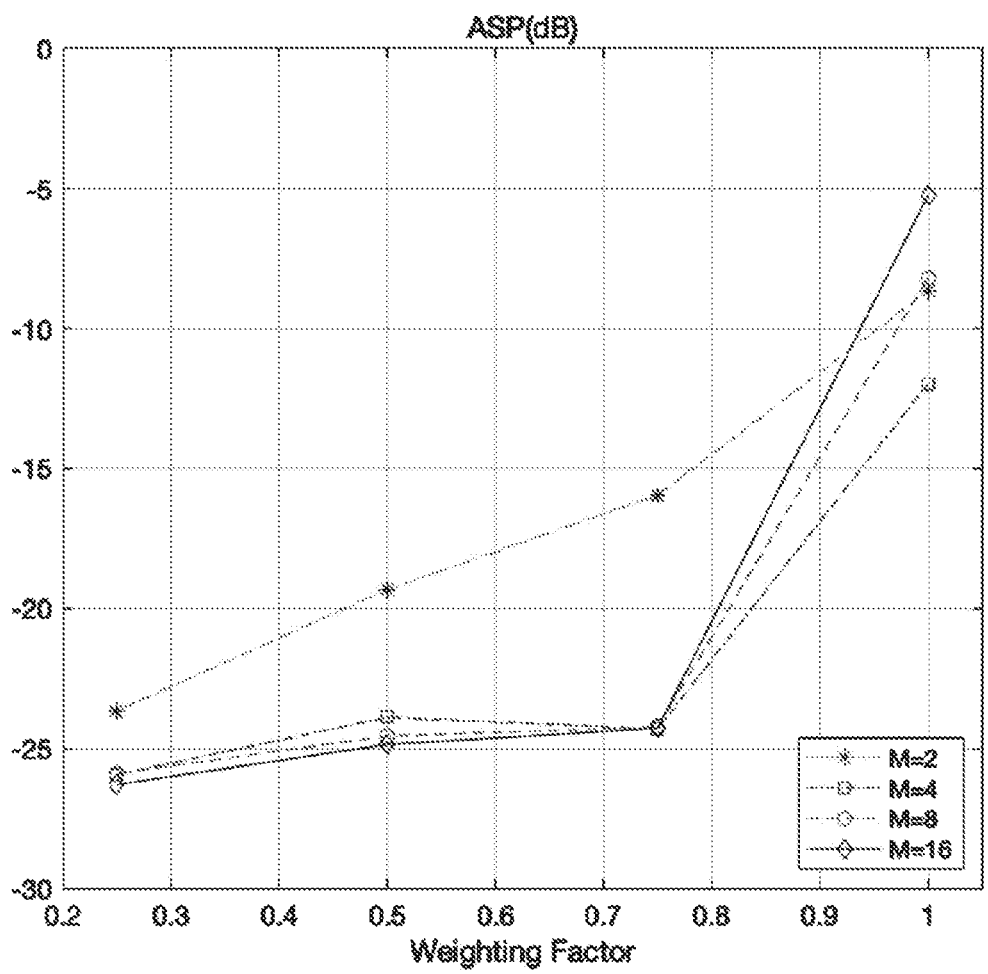
FIGS. 9A and 9B are graphs showing ASP and CP according to the weighting factor λ with various settings of distinct phases M (M=2, 4, 8 and 16) in performance evaluation of the radar-signal generating apparatus according to this embodiment together with comparative examples.
Figure 9B:
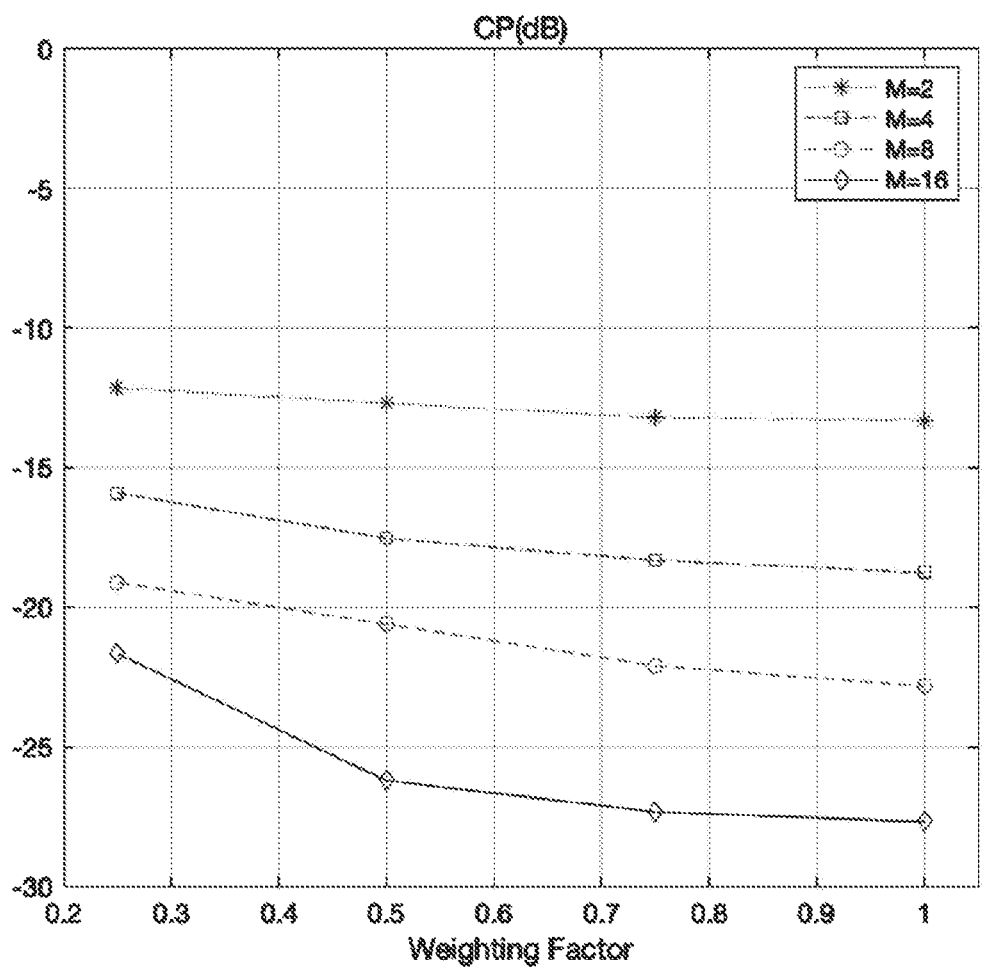

FIGS. 9A and 9B are graphs showing ASP and CP according to the weighting factor $\lambda$ with various settings of distinct phases M (M=2, 4, 8 and 16) in performance evaluation of the radar-signal generating apparatus according to this embodiment together with comparative examples.

In FIGS. 9A and 9B, as expected, CP decreases with the weighting factor $\lambda$ and ASP increases with the weighting factor $\lambda$. There are two interesting observations in FIGS. 9A and 9B. First, ASP slightly increases with $\lambda$ in a ragime of small $\lambda$ ($\leq 0.75$) and abruptly rises with $\lambda$ in a ragime of large $\lambda$ ($>0.75$). However, CP slightly decreases with $\lambda$ in both ragimes. Specifically, the increase in $\lambda$ in the ragime of large $\lambda$ induces little gain in CP, but significantly degrades ASP. Second, any tendency does not found between ASP and M when $\lambda$ is one. However, large M is helpful in reducing CP. This is because ASP is not considered in the optimization process when $\lambda$ is one.

The foregoing method and apparatus for generating the orthogonal radar signal based on the frequency modulation have the following effects.

First, spectrum efficiency is increased by frequency sharing among a plurality of radars.

Second, detection performance is ensured while reducing interference caused by other radars in the frequency-modulation based radar network system where the frequencies are shared.

Third, the existing radar system is recyclable by adding extra module to the existing pulse-compression-based frequency-modulation radar system.

Further, according to the disclosure, the set of orthogonal-coded frequency-modulation waveforms is generated through the optimization frame-work and used for the frequency modulation of the radar system, thereby improving the orthogonal performance of the radar signal while having all advantages of the frequency-modulation based radar signal and the set of orthogonal codes.

Further, according to the disclosure, a new optimization frame-work capable of generating the frequency-modulation waveforms optimized and coded based on the polyphase code having a higher degree of freedom than that of the Walsh-Hadamard code may be provided, and thus overcome the limitations of the related art, thereby proposing a method of generating radar signals between which orthogonal performance is good and maintained even when the number of radars used concurrently is increased, in the frequency-modulation based signal waveform technology.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of generating an orthogonal radar signal based on frequency modulation, the method comprising:
   a first step of generating a set of frequency-modulation waveforms;
   a second step of generating a random polyphase code set;
   a third step of generating a set of coded frequency-modulation waveforms through element operation between the set of frequency-modulation waveforms and the polyphase code set;
   a fourth step of calculating an objective function for the set of frequency-modulation waveforms with regard to a different set of coded frequency-modulation waveforms and previous sets of coded frequency-modulation waveforms, and selecting a current polyphase code set as an optimized polyphase code set when a result of current calculation is better or smaller than a result of previous iteration; and a fifth step of performing phase perturbation by replacing an element randomly selected in the current polyphase code set selected as the optimized polyphase code set with another admissible-phase element, wherein the objective function is defined by a sum of a value, which is obtained by multiplying an autocorrelation sidelobe peak for the set of coded frequency-modulation waveforms by a first weighting factor value, and a value, which is obtained by multiplying a cross-correlation peak for the set of coded frequency-modulation waveform by a second weighting factor.

2. The method according to claim 1, further comprising a sixth step of repeating the third to fifth steps until a preset stop condition is satisfied.

3. The method according to claim 1, wherein a sum of the first weighting factor and the second weighting factor is 1.

4. The method according to claim 1, wherein the autocorrelation sidelobe peak corresponds to a maximum value of a normalized main lobe width smaller than an absolute value of time delay of an arbitrary $i^{th}$ coded frequency-modulation waveform among the absolute values of the $i^{th}$ coded frequency-modulation waveform.

5. The method according to claim 1, wherein the cross-correlation peak corresponds to a maximum value of time delay of an arbitrary $i^{th}$ coded frequency-modulation waveform among the absolute values of the cross-correlation functions of the $i^{th}$ coded frequency-modulation waveform and an arbitrary $j^{th}$ coded frequency-modulation waveform different from the $i^{th}$ coded frequency-modulation waveform.

6. The method according to claim 5, wherein the cross-correlation functions of the $i^{th}$ and $j^{th}$ coded frequency-modulation waveforms with respect to the time delay are generated by multiplying another arbitrary $l^{th}$ coded frequency-modulation waveform by an $l^{th}$ frequency-modulation waveform and an $l^{th}$ polyphase-code sequence.

7. A method of generating an orthogonal radar signal based on frequency modulation, the method comprising:
    generating a set of coded frequency-modulation waveforms through element operation between a set of frequency-modulation waveforms and a polyphase code set; and
    calculating an objective polyphase code set or an optimized polyphase code set based on a domain parameter that minimizes an objective function for the set of coded frequency-modulation waveforms,
    wherein the objective function is calculated by a sum of a value, which is obtained by multiplying an autocorrelation sidelobe peak for the set of coded frequency-modulation waveforms by a first weighting factor value, and a value, which is obtained by multiplying a cross-correlation peak for the set of coded frequency-modulation waveforms by a second weighting factor.

8. The method according to claim 7, wherein the autocorrelation sidelobe peak corresponds to a maximum value of a normalized main lobe width smaller than an absolute value of time delay of an arbitrary $i^{th}$ coded frequency-modulation waveform among the absolute values of the $i^{th}$ coded frequency-modulation waveform.

9. The method according to claim 8, wherein the cross-correlation peak corresponds to a maximum value of time delay of the $i^{th}$ coded frequency-modulation waveform among the absolute values of the cross-correlation functions of the $i^{th}$ coded frequency-modulation waveform and an arbitrary $j^{th}$ coded frequency-modulation waveform different from the $i^{th}$ coded frequency-modulation waveform.

10. The method according to claim 7, wherein the cross-correlation functions of the $i^{th}$ nd $j^{th}$ coded frequency-modulation waveforms with respect to the time delay are generated by multiplying another arbitrary $l^{th}$ coded frequency-modulation waveform by an $l^{th}$ frequency-modulation waveform and an $l^{th}$ polyphase-code sequence.

11. An apparatus for generating an orthogonal radar signal based on frequency modulation, the apparatus comprising:
    an element operation module configured to generate a set of coded frequency-modulation waveforms from a set of input frequency-modulation waveforms and a randomly generated polyphase code set;
    a calculation module configured to calculate an objective function for the set of frequency-modulation waveforms with respect to a different set of coded frequency-modulation waveforms and previous sets of coded frequency-modulation waveforms, and select a current polyphase code set as an optimized polyphase code set when a result of current calculation is better or smaller than a result of previous iteration; and
    a polyphase-code perturbation module configured to perform polyphase-phase perturbation by replacing an element randomly selected in the current polyphase code set selected as the optimized polyphase code set with another admissible-phase element,
    wherein the objective function is calculated by a sum of a value, which is obtained by multiplying an autocorrelation sidelobe peak for the set of coded frequency-modulation waveforms by a first weighting factor value, and a value, which is obtained by multiplying a cross-correlation peak for the set of coded frequency-modulation waveform by a second weighting factor.

12. The apparatus according to claim 11, further comprising:
    an input terminal connected to the element operation module and configured to receive the set of frequency-modulation waveforms; and
    an output terminal connected to the calculation module and configured to output a set of optimized coded LFM(linear frequency modulation) waveforms through element operation between the optimized polyphase code set and the set of frequency-modulation waveforms.

13. The apparatus according to claim 11, wherein a sum of the first weighting factor and the second weighting factor is 1.

14. The apparatus according to claim 11, wherein the autocorrelation sidelobe peak corresponds to a maximum value of a normalized main lobe width smaller than an absolute value of time delay of an arbitrary $i^{th}$ coded frequency-modulation waveform among the absolute values of the $i^{th}$ coded frequency-modulation waveform.

15. The apparatus according to claim 11, wherein the cross-correlation peak corresponds to a maximum value of time delay of an arbitrary $i^{th}$ coded frequency-modulation waveform among the absolute values of the cross-correlation functions of the $i^{th}$ coded frequency-modulation waveform and an arbitrary $j^{th}$ coded frequency-modulation waveform different from the $i^{th}$ coded frequency-modulation waveform.

16. The apparatus according to claim 11, further comprising a condition setting module coupled to the calculation module and configured to repeat the operations of the element operation module, the calculation module and the polyphase-code perturbation module until a preset stop condition is satisfied.

17. The apparatus according to claim 11, wherein the element operation module, the calculation module and the polyphase-code perturbation module are coupled individually or as a single module assembly to a pulse-compression-based frequency-modulation radar system.

18. The apparatus according to claim 17, wherein the pulse-compression-based frequency-modulation radar system comprises a plurality of radars that share frequencies.

* * * * *